United States Patent [19]
Müller et al.

[11] Patent Number: 6,142,485
[45] Date of Patent: Nov. 7, 2000

[54] CHUCK FOR ROTARY TOOLS

[75] Inventors: Gebhard Müller; Michael Schuffenhauer, both of Fürth; Martin Prey, Pfreimd, all of Germany

[73] Assignee: Kennametal Inc., Latrobe, Pa.

[21] Appl. No.: 09/303,502

[22] Filed: Apr. 30, 1999

Related U.S. Application Data

[63] Continuation-in-part of application No. PCT/EP98/01645, Mar. 20, 1998.

[30] Foreign Application Priority Data

Apr. 23, 1997 [DE] Germany .......................... 197 17 005

[51] Int. Cl.$^7$ .................................................. B23B 31/107
[52] U.S. Cl. ........................... 279/83; 403/362; 411/393; 411/544; 439/814; 285/404
[58] Field of Search ............................. 279/83; 409/232, 409/234; 403/362; 285/404; 411/393, 544; 439/814

[56] References Cited

U.S. PATENT DOCUMENTS

| | | |
|---|---|---|
| 917,087 | 4/1909 | Lovenich . |
| 2,273,102 | 2/1942 | Harris et al. ............................. 411/393 |
| 2,355,899 | 8/1944 | Beede ...................................... 411/393 |
| 3,762,731 | 10/1973 | Matsumoto . |
| 4,133,545 | 1/1979 | Komori . |
| 4,611,960 | 9/1986 | Quenneville et al. . |
| 4,668,138 | 5/1987 | Carter . |
| 4,913,607 | 4/1990 | von Haas . |
| 5,141,370 | 8/1992 | Baumann . |
| 5,324,052 | 6/1994 | Ortmann ................................... 279/83 |
| 5,613,693 | 3/1997 | Ramunas . |

FOREIGN PATENT DOCUMENTS

| | | |
|---|---|---|
| 0189068 | 7/1986 | European Pat. Off. . |
| 2608490 | 6/1988 | France . |
| 1103112 | 8/1957 | Germany . |
| 2726077 | 12/1978 | Germany . |
| 3728727 | 3/1989 | Germany . |
| 9010657 | 11/1990 | Germany . |
| 4307280 | 10/1993 | Germany . |
| 29908 | 2/1915 | United Kingdom . |
| 9847649 | 10/1998 | WIPO . |

*Primary Examiner*—Steven C. Bishop
*Attorney, Agent, or Firm*—Nils H. Ljungman & Associates

[57] ABSTRACT

A chuck for rotary tools with a cylindrical chucking shank encloses such shank with a basic body. A radial through-hole in basic body serves to receive a clamping screw which applies pressure to a clamping member which is seated inside a through-hole between the clamping screw and chucking shank. A clamping member is provided with a radial projection and the through-hole with a cross-sectional narrowing along its inner end. In between the radial projection and the narrowing is an elastically compressible spring element which, due to its return force, lifts the clamping element away from the chucking shank and pushes it back into the through-hole when it is not under tension from the clamping screw.

13 Claims, 2 Drawing Sheets

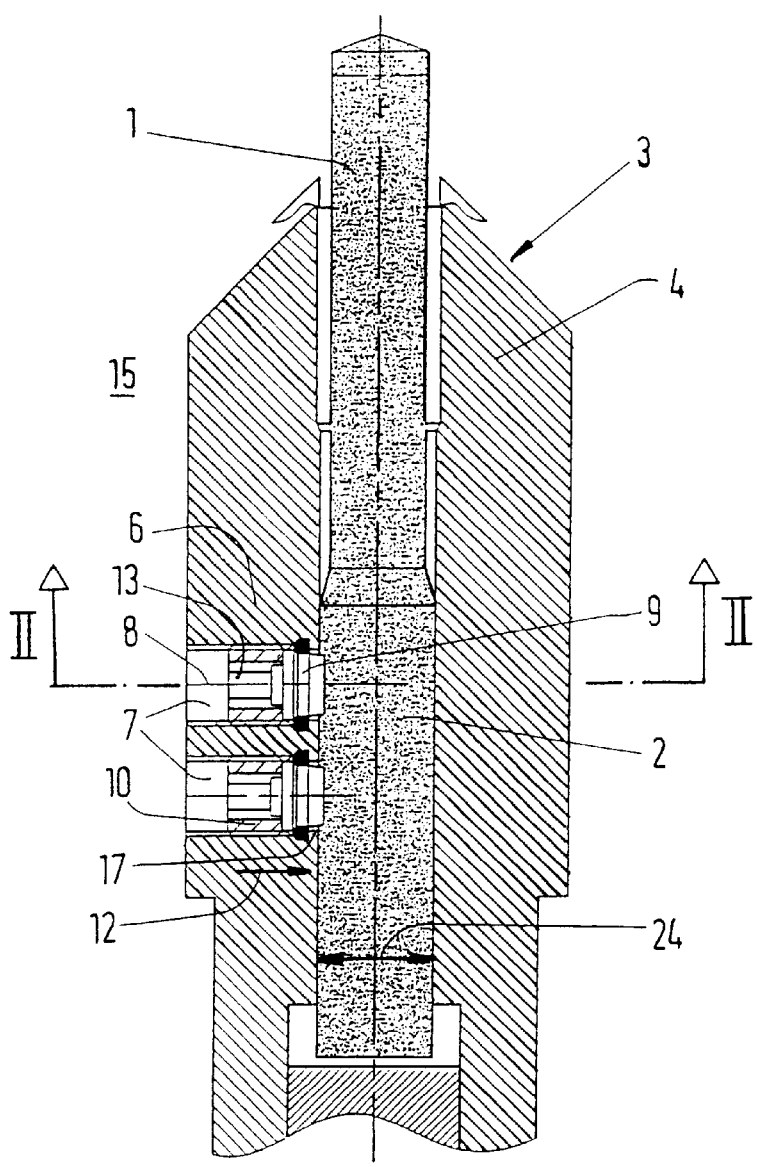
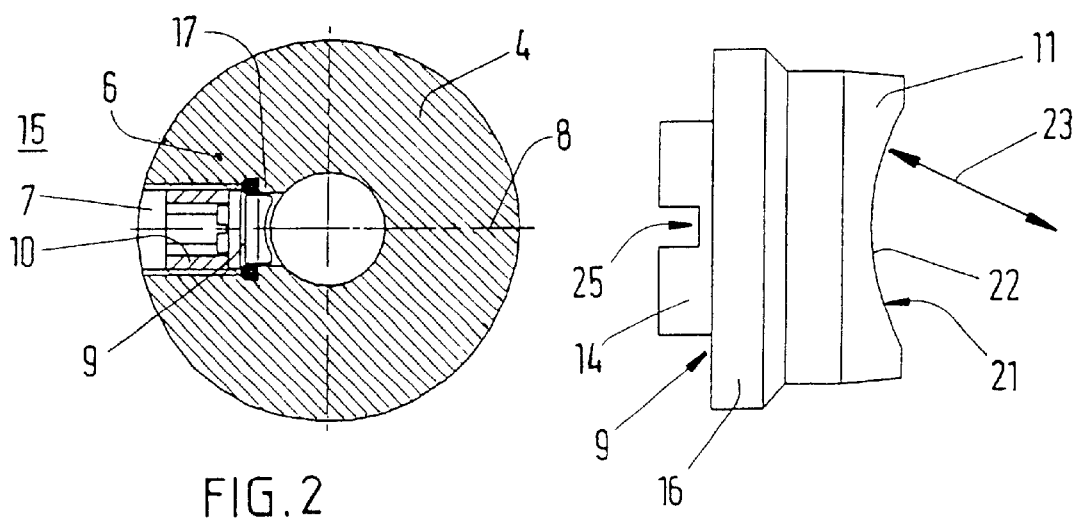

CHUCK FOR ROTARY TOOLS

CONTINUING APPLICATION DATA

This application is a Continuation-In-Part application of the International Application No. PCT/EP98/01645, filed on Mar. 20, 1998, which claims priority from Federal Republic of Germany Patent Application No. 197 17 005.6, filed on Apr. 23, 1997. International Application No. PCT/EP98/01645 was pending as of the filing date of the above-cited application. The United States was an elected state in International Application No. PCT/EP98/01645.

BACKGROUND OF THE INVENTION

1. Field of the Invention

The present invention relates to a chuck for rotary tools, which chuck has a basic body surrounding the tool's cylindrical chucking shank in the form of a sleeve. The enclosure wall of the basic body, which surrounds a receiving space for the tool's chucking shank, is penetrated by a substantially radial through-hole and has a clamping screw screwed into the through-hole, which clamping screw applies pressure in a screw-in direction to the chucking shank inserted in the receiving space.

2. Background Information

In metal working, rotary tools are clamped into the machine tool by means of a chuck. Preferred are rotary tools with standardized tool shanks. Conventionally, such tool shanks have a flattened area to provide positive locking for torque transmission. Particularly for the use in drilling tools, however, tool shanks are made fully cylindrical without this flattened area since they are cheaper to produce (DIN 1835 A and 6535 A). In such tools, torque is transmitted through an interference fit. The chuck according to the present invention is intended for this latter type of rotary tools with a fully cylindrical chucking shank.

In chucks of the known art for rotary tools which are equipped with fully cylindrical shanks, torque can be transmitted by frictional locking in that a clamping screw applies direct radial pressure to the shank. Such chucks are suitable only for transmitting low torques which frequently are inadequate for drilling work. To increase the torque to be transmitted, it is known, in chucks for tools with fully cylindrical chucking shanks, to embed the shank in a slit sleeve within the basic body of the chuck. The clamping screw which is radially screwed into the basic body applies pressure on said sleeve from the outside, that is, it acts indirectly on the chucking shank. This solution presupposes that sufficient space is available for mounting the sleeve. Moreover, a sleeve means increased building costs.

To eliminate the need for such a sleeve between the clamping screw and the shank, and nevertheless to guarantee a good transmission of torque, it is known on chucks of the known art that a clamping member can be positioned between the clamping screw and the shank in the radial through-hole, which clamping member is mounted so that it cannot rotate around the axis of the hole, but can be displaced in the direction in which it was screwed in. The clamping member applies pressure to the chucking shank with its end, and is pressurized on its reverse side by the clamping screw (GB-29 908;1913). As a result of the mounting of the clamping member in the through-hole so that it can be displaced axially but cannot rotate, it is possible to provide the end surface of the clamping piece that presses against the chucking shank with a surface contour that corresponds to the chucking shank, thus achieving a superficial application of pressure to the chucking shank.

On a similar chuck of the known art, likewise with a clamping piece inserted between the clamping screw and the chucking shank of the tool, the clamping member is embedded in a a captive manner in a receiving space on the end of the clamping screw, so that when the clamping screw is loosened or is unscrewed from the chucking shank of the tool, the clamping member can be extracted and removed along with it (U.S. Pat. No. 4,511,960). This arrangement facilitates the insertion and removal of the chucking shank in the chuck. The captive embedding of the clamping member on the end of the fastening screw, however, requires deformation of the compression screw, and thus requires considerable time, effort and expense in its fabrication. The clamping member also generally rotates along with the clamping screw when it is not in contact with the chucking shank of the tool. The rotational position of the clamping member is thereby undesirably modified.

OBJECT OF THE INVENTION

The object of the invention is to design a chuck of this type, such that it is simple to manufacture and is capable of transmitting high torques to the chucking shank without requiring additional space.

This object can be achieved in a chuck for rotary tools having a basic body surrounding the tool's cylindrical chucking shank in the form of a sleeve, wherein the enclosure wall of such basic body surrounding a receiving space for the tool's chucking shank is penetrated by a substantially radial through-hole, and a clamping screw is screwed into the through-hole which applies pressure in the screw-in direction to the chucking shank inserted in the receiving space, characterized by the fact that within the through-hole, between the clamping screw and receiving space, a clamping member is adjustably inserted whose base, facing the receiving space, is adapted to the shape of the chucking shank such as to apply two-dimensional pressure. The clamping member is provided with a radial projection forming an axial stop to ensure locating in relation to a cross-sectional narrowing on the inner end of the through-hole, and between the radial projection of the clamping member and the cross-sectional narrowing of the through-hole, an elastically compressible spring element is disposed which, due to its return force, presses the clamping member, when not under tension from the clamping screw, outward against the screw-in direction.

A further object of the invention, on a chuck of the type described above, is therefore to essentially guarantee in a simple manner that when the clamping screw is loosened, the clamping piece can be removed from the chucking shank without any particular additional manufacturing effort or expense, and thus the chucking shank can be inserted into the chuck and removed from it without substantial jamming.

This solution essentially does not require any additional radial space that might lead to an increase in the diameter of the main casting of the chuck. This solution also substantially ensures that when the clamping screw is loosened, the clamping member can be displaced radially outward far enough that its head end is out of the receiving space for the chucking shank. This also can compensate for manufacturing tolerances of the chucking shank. Finally, this solution can essentially promote a non-jamming extraction of the tool from the main casting. This design also can facilitate the appropriate positioning of the clamping member, of which there are generally a plurality when high torques must be transmitted.

SUMMARY OF THE INVENTION

The design according to the present invention is characterized in that, comparable to sleeves of the known art, the clamping screw applies the pressure to the chucking shank indirectly and two-dimensionally, but does not require any additional space that would add to the diameter of the basic body. Furthermore, the present invention can permit the chucking shaft to be set into the basic body without clamping because the spring element shifts the clamping member radially outward when the clamping screw is loosened such that its face end is removed from the area receiving the chucking shank. Moreover, this design can easily compensate for chucking shank tolerances. Finally, it can promote clamping-free removal of the tool from the basic body. The design furthermore can facilitate the proper positioning of the clamping member, of which, as a rule, a plurality is necessary for the transfer of higher torques.

The spring element is particularly preferably designed as a ring made of an elastic rubber material that can lie against an annular flange of a clamping member, and which spring element is particularly an O-ring which can surround a circular sheath portion of the clamping member. This makes it suitable—preferably where the spring element is permanently inserted in an annular groove in the through-hole and applying radially inward initial pressure to the clamping element—for securing the rotational position of the clamping member within the through-hole. The ring shape and the elastic rubber material, as well as the selected initial stress conditions, produce frictional locking which, if suitably dimensioned, does not interfere with the return force acting axially on the clamping member but prevents any unwanted rotation of the clamping member within the through-hole. The fact that the spring element prevents such rotation is particularly advantageous in view of the indentation in the face end of the clamping member that applies pressure to the chucking shank. The indentation requires the clamping member to be aligned, such that its indentation fits against the chucking shank to be inserted in the receiving space. Once this alignment has been achieved, it is to be maintained as far as possible so that the indentation of the clamping member does not need to be realigned with respect to the chucking shank with each new clamping procedure. The elastic ring shape of the spring element also acts as an O-ring when the clamping screw is tightened.

The indentation at the base of the clamping member is preferably dimensioned in the shape of a hollow cylinder segment serving as a contact surface, the diameter of curvature of which is slightly smaller than the nominal diameter of the associated chucking shank. During clamping, it can permit on the one hand the partial clasping of the tool's shank by the clamping member, which can apply pressure to the chucking shank and is provided with an indentation to form a contact surface adapted to the shape of the surface of the chucking shank. During clamping, the diameter of curvature of the indentation, which is slightly smaller than the nominal diameter of the chucking shank, causes a slight expansion of the clasping indentation which falls within the elasticity range of the material used for the clamping member, and thus substantially ensures the elastic springback of the clamping member from the chucking shank after the clamping screw is loosened. As a result, when the clamping screw is loosened, the clamping member automatically detaches itself from its full-area rest against the chucking shank. The return force acting on the clamping member through the compression of the spring element in the direction away from the tool shank is then required merely to shift the clamping member.

In another possible embodiment according to the present invention, the clamping screw can be penetrated in the axial direction by a torque-receiving opening, such as a hexagon socket, and the face end of the clamping member is provided with an opening, particularly a slit, for torque engagement reaching through the clamping screw. This can permit the adjustment from the outside through the clamping screw of the rotational position of the clamping member in relation to the chucking shank, e.g. by means of a screwdriver.

The above discussed embodiments of the present invention will be described further hereinbelow with reference to the accompanying figures. When the word "invention" is used in this specification, the word "invention" includes "inventions," that is, the plural of "invention." By stating "invention," the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The figures further illustrate the invention by way of example.

FIG. 1 is a longitudinal section through the chuck with a clamped drill bit;

FIG. 2 is a section through the chuck along Line II—II of FIG. 1, which chuck is in its loosened position with the drill bit removed;

FIG. 3 is an enlarged side view of the clamping member; and

DESCRIPTION OF THE PREFERRED EMBODIMENT

Figure 4:
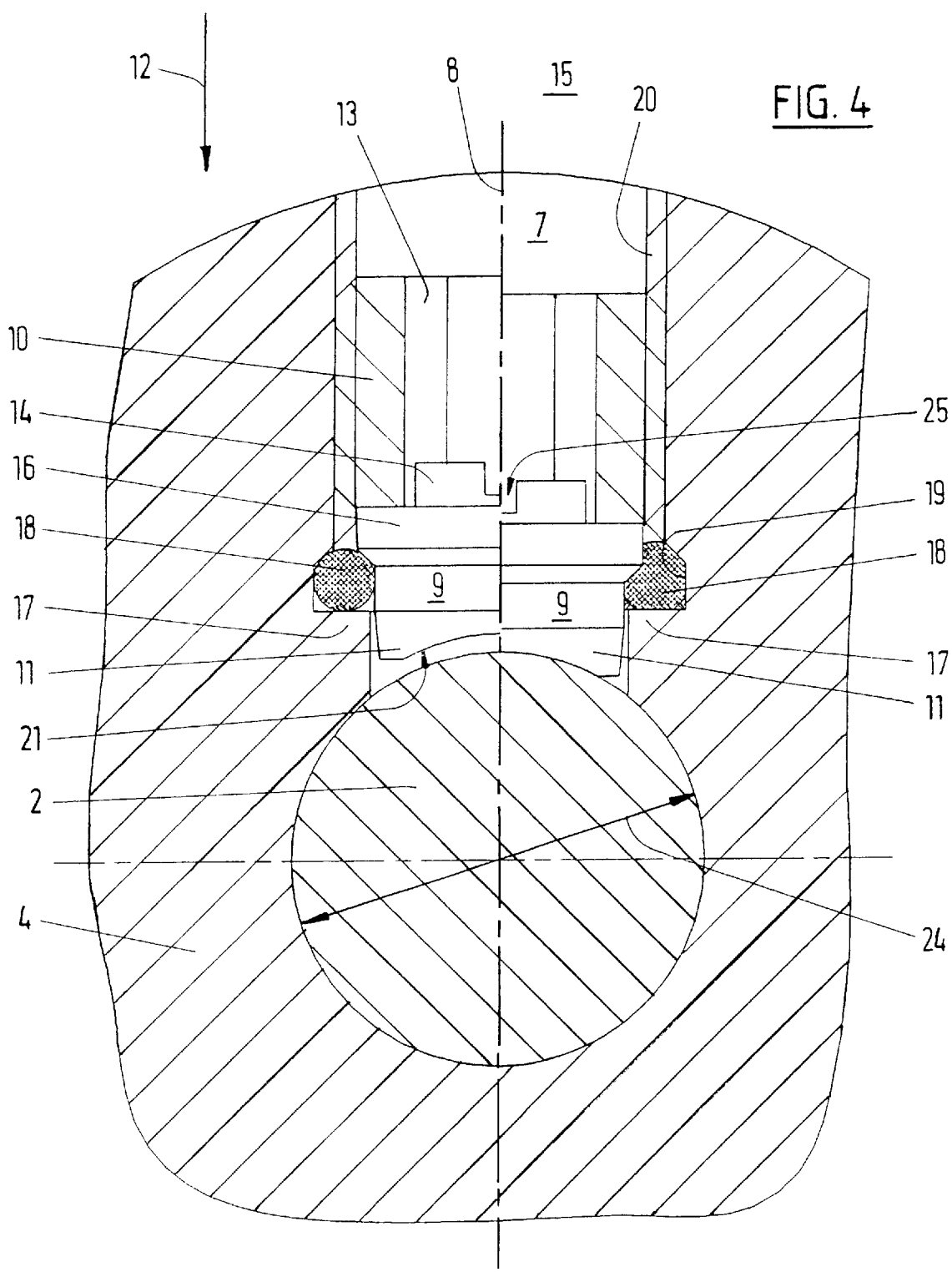
FIG. 4 is a section through the chuck analogous to FIG. 2 with the clamping member or the clamping screw next to the center axis of the through-hole shown in loosened position on the left side, identified as a), and in clamped position on the right side, identified as b).

As can be seen in FIG. 1, chuck 3 serves to clamp a drill bit 1, whose chucking shank 2 is fully cylindrical in accordance with DIN 1835 A and 6535 A. Chuck 3 surrounds chucking shank 2 with basic body 4 in the manner of a sleeve. Basic body 4 receives chucking shank 2 with its receiving space 5 which accordingly has the shape of a hollow cylinder. Enclosure wall 6 of basic body 4 surrounding receiving space 5 is penetrated by a plurality of axially offset through-holes 7. Hole axes 8 of through-holes 7 extend radially, as shown in FIG. 2. The inner end of each through-hole 7 facing receiving space 5 serves to receive a clamping member 9 and, on the outside, a clamping screw 10 applying radially inward pressure to clamping member 9. Clamping member 9 is provided with a base 11 which is adapted to the cylindrical shape of chucking shank 2 of drill bit 1.

From the outside, clamping screw 10 can be screwed radially inward in screwing direction 12. Clamping screw 10 is provided with a continuous hexagon socket 13 extending in the direction of the hole axis 8 to receive the torque. The fact that hexagon socket 13 extends through clamping screw 10 makes it possible at all times to reach face end 14 (see FIG. 4) of clamping member 9 from the outside 15 of basic body 4.

As can be seen in FIGS. 2–4, clamping member 9 is provided with an annular flange 16 which is a radial projection forming an axial stop with respect to ring-shaped collar 17 acting as a cross-sectional narrowing along the inner end of through-hole 7. Disposed between annular flange 16 and collar 17 is a ring-shaped spring element 18 made, for example, of compressible elastic rubber material. Such spring element 18 is an O-ring which, due to its elastic return force, pushes clamping member 9 outward against screwing direction 12 as long as no force is applied to clamping member 9 by clamping screw 10. The O-ring is also effective as a seal. Spring element 18 surrounds the cross-sectionally cylindrical sheath portion of clamping member 9 with a certain initial stress that acts radially inward and generates frictional locking to secure the rotational position, once adjusted, of clamping member 9 within through-hole 7 even if clamping screw 10 is loosened. Spring element 18 is permanently inserted in an annular groove 19 made in through-hole 7. Annular groove 19 is located between collar 17 at the inner hole exit and internal thread 20 which extends from the outside 15 of through-hole 7 inward up to annular groove 19 and serves to receive hexagon socket screw 10.

As shown in FIG. 3, at its base 11, clamping member 9 has an indention to form a contact surface 21 which is adapted to the surface of chucking shank 2. Indentation 22 has the shape of a hollow cylinder segment with a diameter of curvature 23 which is slightly smaller than the nominal diameter 24 of chucking shank 2.

The face end 14 of clamping member 9 is provided with a slit 25 (see FIG. 3) for torque engagement through clamping screw 10, e.g. by means of a screwdriver blade or similar device. This permits the rotational position of clamping member 9 to be adjusted in relation to clamping shank 2 to align its indentation 22.

In the initial clamping position, as shown in FIG. 4, side a), base 11 of clamping member 9 is lifted away from chucking shank 2 and retracted into through-hole 7. In this initial position, retracted within through-hole 7, drill bit 1 with its chucking shank 2 is unobstructed and can be inserted into receiving space 5 of basic body 4. To align indentation 22 of contact surface 21 of base 11 in relation to chucking shank 2, such that base 11 is not misaligned with respect to chucking shank 2, the rotational position of clamping member 9 can be corrected by means of a screwdriver that is applied from the outside 15 and engages with slit 25 on face end 14 of clamping member 9. Clamping member 9 is frictionally engaged in this rotational position by spring element 18, i.e. an O-ring, which is permanently inserted in annular groove 19. Clamping screw 11 is then screwed in by a torque engaging with its hexagonal socket 13. This causes clamping member 9 to be brought into its clamped position, as may be seen in FIG. 4, side b), in which spring element 18 is compressed. During clamping, indentation 22 on base 11 of clamping member 9 is slightly expanded in its elastic material area with the result that indentation 22 has a slightly larger diameter of curvature 23, as shown in FIG. 3.

To release the tension, clamping screw 10 is moved back against screwing direction 12. The expansion of indentation 22 of face end 11 of clamping member 9 springs back elastically such that indentation 22 detaches itself from its surface contact along the circumference of chucking shank 2. Furthermore, spring element 18 is decompressed from its compressed clamping position into its relaxed initial position, as shown in FIG. 4, side a). This causes clamping member 9 to be pressed into through-hole 7. Its face end 11 loses all contact with chucking shank 2. It is lifted away from chucking shank 2 and pushed back from receiving space 5 so that it does not interfere with the insertion of a new drill bit 1, as can be seen in FIG. 2.

One feature of the invention resides broadly in the chuck for rotary tools having a basic body 4 surrounding the tool's cylindrical chucking shank 2 in the form of a sleeve, wherein the enclosure wall 6 of such basic body 4 surrounding receiving space 5 for the tool's chucking shank 2 is penetrated by a substantially radial through-hole 7 and having a clamping screw 10 screwed into through-hole 7 which applies pressure in screw-in direction to a chucking shank 2 inserted in receiving space 5 characterized by the fact that within the through-hole, between clamping screw 10 and receiving space 5, a clamping member 9 is adjustably inserted whose base 11 facing receiving space 5 is adapted to the shape of clamping shaft 2 such as to apply two-dimensional pressure, that clamping member 9 is provided with a radial projection 16 forming an axial stop to ensure locating in relation to a cross-sectional narrowing 17 on the inner end of through-hole 7 and that between radial projection 16 of clamping member 9 and cross-sectional narrowing 17 of the through-hole, an elastically compressible spring element 18 is disposed which, due to its return force, presses clamping member 9, when not under tension from clamping screw 10, outward against screw-in direction 12.

Another feature of the invention resides broadly in the chuck characterized by the fact that the radial projection of clamping member 9 is formed by annular flange 16.

Yet another feature of the invention resides broadly in the chuck characterized by the fact that the cross-sectional narrowing is a ring-shaped collar 17 which comprises the hole exit toward receiving space 5.

Still another feature of the invention resides broadly in the chuck characterized by the fact that collar 17 is concentric with hole axis 8 of through hole 7.

A further feature of the invention resides broadly in the chuck characterized by the fact that spring element 18 is a ring made of an elastic rubber material lying against annular flange 16 of clamping member 9.

Another feature of the invention resides broadly in the chuck characterized by the fact that spring element 18 is an O-ring surrounding a cross-sectionally circular sheath portion of clamping member 9.

Yet another feature of the invention resides broadly in the chuck characterized by the fact that spring element 18 is permanently inserted in an annular groove 19 made in through-hole 7.

Still another feature of the invention resides broadly in the chuck characterized by the fact that spring element 18 applies radially inward initial tension to clamping element 9.

A further feature of the invention resides broadly in the chuck characterized by the fact that base 11 of clamping member 9 which applies pressure to chucking shank 2 is provided with an indentation to form a contact surface 21 adapted to the shape of the surface of chucking shank 2.

Another feature of the invention resides broadly in the chuck characterized by the shape of a hollow cylinder segment serving as contact surface 21, the diameter of curvature 23 of which is slightly smaller than the nominal diameter 24 of the associated chucking shank 2.

Yet another feature of the invention resides broadly in the chuck characterized by the fact that clamping screw 10 is penetrated in axial direction by a torque-receiving opening, particularly a hexagon socket 13 and that face end 14 of clamping member 9 is provided with an opening, particularly a slit 25, for torque engagement reaching through clamping screw 10.

Some examples of chucks, chucks for rotary tools, and clamping pieces or members for chucks, that could be adapted for use in the context of the present invention and include components that could be adapted for use in embodiments of the present invention could be found in the following U.S. Pat. No. 5,833,247, issued on Nov. 10, 1998 to inventors Deuschle, et al.; U.S. Pat. No. 5,829,761, issued on Nov. 3, 1998 to inventor Rohm; U.S. Pat. No. 5,820,134, issued on Oct. 13, 1998 to inventor Subils Valls; U.S. Pat. No. 5,816,584, issued on Oct. 6, 1998 to inventors Miles, et al.; U.S. Pat. No. 5,807,038, issued on Sep. 15, 1998 to inventor Skinner; U.S. Pat. No. 5,765,839, issued on Jun. 16, 1998 to inventor Rohm; U.S. Pat. No. 5,699,867, issued on Dec. 23, 1997 to inventor Jones; U.S. Pat. No. 5,685,549, issued on Nov. 11, 1997 to inventor Yang; U.S. Pat. No. 5,624,125, issued on Apr. 29, 1997 to inventor Rohm; U.S. Pat. No. 5,590,985, issued on Jan. 7, 1997 to inventor Mack; U.S. Pat. No. 5,531,549, issued on Jul. 2, 1996 to inventor Fossella; U.S. Pat. No. 5,531,461, issued on Jul. 2, 1996 to inventors Huff, et al.; U.S. Pat. No. 5,524,910, issued on Jun. 11, 1996 to inventors Chase, et al.; U.S. Pat. No. 5,499,829, issued on Mar. 19, 1996 to inventor Rohm; U.S. Pat. No. 5,411,275, issued on May 2, 1995 to inventors Huff, et al.; U.S. Pat. No. 5,398,946, issued on Mar. 21, 1995 to inventor Quiring; U.S. Pat. No. 5,378,002, issued on Jan. 3, 1995 to inventor Rohm; U.S. Pat. No. 5,354,075, issued on Oct. 11, 1994 to inventors Marik, et al.; U.S. Pat. No. 5,340,128, issued on Aug. 23, 1994 to inventors Weiss, et al.; U.S. Pat. No. 5,322,303, issued on Jun. 21, 1994 to inventor Nakamura; U.S. Pat. No. 5,183,274, issued on Feb. 2, 1993 to inventor Sakamaki; U.S. Pat. No. 5,172,923, issued on Dec. 22, 1992 to inventor Nakamura; U.S. Pat. No. 5,044,643, issued on Sep. 3, 1991 to inventor Nakamura; U.S. Pat. No. 4,610,585, issued on Sep. 9, 1986 to inventors Fellmeth, et al.; and U.S. Pat. No. 4,560,179, issued on Dec. 24, 1985 to inventors Steinberger, et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 197 17 005.6, filed on Apr. 23, 1997, having inventors Gebhard Müller, Michael Schuffenhauer, and Martin Prey, and DE-OS 197 17 005.6 and DE-PS 197 17 005.6 and International Application No. PCT/EP98/01645, filed on Mar. 20, 1998, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A chuck for a rotary tool, said chuck comprising:

a receiving portion;

said receiving portion being configured to receive and surround at least a portion of a chucking shank;

a radial through-hole;

said radial through-hole being disposed in said receiving portion configured to surround a chucking shank;

a clamping arrangement;

said clamping arrangement comprising:
    a clamping screw;
    said clamping screw being configured to be screwed into
    said radial through-hole to apply pressure to a chucking shank;
    a clamping member;
    said clamping member being disposed in said radial through-hole;
    said clamping member comprising a base portion, which base portion is configured to be disposed to face a chucking shank and is configured to a shape of a chucking shank to apply two-dimensional pressure; and
    said clamping member comprising a radial projection;

said radial through-hole comprising an inner section and an outer section;

said inner section of said radial through-hole being configured to be disposed between said outer section of said radial through-hole and a chucking shank;

said inner section of said radial through-hole being narrower in diameter than said outer section of said radial through-hole;

said radial projection being configured to form an axial stop;

an elastically-compressible resilient element;

said resilient element being disposed between said radial projection of said clamping member and said inner section of said radial through-hole;

said resilient element being configured to be compressed upon screwing in of said clamping member by said clamping screw; and said resilient element being configured to apply a return force to said clamping member to move said clamping member in the direction opposite the screw-in direction upon a release of pressure on said resilient element from said clamping member.

2. The chuck according to claim 1, wherein said radial projection of said clamping member is formed by an annular flange.

3. The chuck according to claim 1, wherein:

said inner section comprises a ring-shaped collar;

said ring-shaped collar comprises an opening; and said opening is disposed to open toward the interior of said chuck.

4. The chuck according to claim 3, wherein said ring-shaped collar is substantially concentric with respect to the axis of said radial through-hole.

5. The chuck according to claim 1, wherein:

said resilient element is substantially ring-shaped;

said resilient element comprises an elastic rubber material; and said resilient element is configured and disposed to lie against said radial projection of said clamping member.

6. The chuck according to claim 5, wherein:

said resilient element is an O-ring;

said clamping member comprises a cross-sectionally circular sheath portion; and said O-ring is configured and disposed to surround said sheath portion of said clamping member.

7. The chuck according to claim 1, wherein:

said radial through hole comprises an annular groove; and said resilient element is inserted in said annular groove.

8. The chuck according to claim 6, wherein said resilient element applies radially inward initial tension to said clamping member.

9. The chuck according to claim 7, wherein said resilient element applies radially inward initial tension to said clamping member.

10. The chuck according to claim 1, wherein said base portion of said clamping member which applies pressure to a chucking shank is provided with an indentation to form a contact surface adapted to the shape of the surface of a chucking shank.

11. The chuck according to claim 10, wherein the diameter of curvature of said base portion of said clamping member is slightly smaller than the nominal diameter of a corresponding chucking shank.

12. The chuck according to claim 1, wherein:

said clamping screw comprises an axial opening;

said axial opening forms a hexagon socket;

said clamping member comprises an end face disposed on an end opposite said base portion; and said end face comprises a slit-like opening.

13. A chuck for a rotary tool, said chuck comprising:

a receiving portion;

said receiving portion being configured to receive and surround at least a portion of a chucking shank;

a radial through-hole;

said radial through-hole being disposed in said receiving portion configured to surround a chucking shank;

a clamping arrangement;

said clamping arrangement comprising:

a clamping screw portion;

said clamping screw portion being configured to be screwed into said radial through-hole to apply pressure to a chucking shank;

a clamping member;

said clamping member being disposed in said radial through-hole; and said clamping member comprising a radial projection;

said radial through-hole comprising an inner section and an outer section;

said inner section of said radial through-hole being configured to be disposed between said outer section of said radial through-hole and a chucking shank;

said inner section of said radial through-hole being narrower in diameter than said outer section of said radial through-hole;

said radial projection being configured to form an axial stop;

an elastically-compressible resilient element;

said resilient element being disposed between said radial projection of said clamping member and said inner section of said radial through-hole;

said resilient element being configured to be compressed upon screwing in of said clamping member by said clamping screw portion; and said resilient element being configured to apply a return force to said clamping member to move said clamping member in the direction opposite the screw-in direction upon a release of pressure on said resilient element from said clamping member.

* * * * *

UNITED STATES PATENT AND TRADEMARK OFFICE
CERTIFICATE OF CORRECTION

PATENT NO. : 6,142,485
DATED : November 7, 2000
INVENTOR(S) : Gebhard Mueller, Michael Schuffenhauer, and Martin Prey It is certified that error appears in the above-identified patent and that said Letters Patent is hereby corrected as shown below:

Replace "Assignee:
Kennametal Inc., Latrobe, Pa." with --Assignee: Kennametal PC Inc., Monrovia, Ca.--

Signed and Sealed this

Twelfth Day of June, 2001

*Attest:*

NICHOLAS P. GODICI
*Attesting Officer*    Acting Director of the United States Patent and Trademark Office